(12) United States Patent
Carmel

(10) Patent No.: US 12,395,114 B2
(45) Date of Patent: Aug. 19, 2025

(54) ENERGY HARVESTING SYSTEM

(71) Applicant: VERTICAL GREEN ENERGY LTD, Herzlia (IL)

(72) Inventor: Aviv Carmel, Herzlia (IL)

(73) Assignee: VERTICAL GREEN ENERGY LTD, Herzlia (IL)

( * ) Notice: Subject to any disclaimer, the term of this patent is extended or adjusted under 35 U.S.C. 154(b) by 0 days.

(21) Appl. No.: 18/688,452

(22) PCT Filed: Sep. 1, 2022

(86) PCT No.: PCT/IL2022/050959
§ 371 (c)(1),
(2) Date: Mar. 1, 2024

(87) PCT Pub. No.: WO2023/031935
PCT Pub. Date: Mar. 9, 2023

(65) Prior Publication Data
US 2024/0356480 A1    Oct. 24, 2024

Related U.S. Application Data

(60) Provisional application No. 63/239,978, filed on Sep. 2, 2021.

(51) Int. Cl.
*H02S 10/12*     (2014.01)
*F03D 1/02*      (2006.01)
(Continued)

(52) U.S. Cl.
CPC ............... *H02S 10/12* (2014.12); *F03D 1/02* (2013.01); *F03D 1/041* (2023.08); *F03D 3/005* (2013.01);
(Continued)

(58) Field of Classification Search
CPC .......... H02S 10/12; H02S 20/32; H02S 40/38; F03D 9/14; F03D 9/16; F03D 13/203;
(Continued)

(56) References Cited

U.S. PATENT DOCUMENTS 8,487,469 B2    7/2013   Christy
10,790,724 B2   9/2020   Coman
(Continued)

FOREIGN PATENT DOCUMENTS

CN    103161325 A    6/2013
EP      2108818 A2   10/2009
(Continued)

OTHER PUBLICATIONS

International Preliminary Report on Patentability for PCT/IL2022/050959, filed Sep. 1, 2022.
(Continued)

*Primary Examiner* — Viet P Nguyen
(74) *Attorney, Agent, or Firm* — Paul D. Bianco; Fleit Intellectual Property Law

(57) ABSTRACT

Energy harvesting system, for harvesting energy from renewable resources, including an array of wind turbines disposed along a towering construction, and plurality of laterally outlying ledges branching outwardly in vertically spaced-apart respective levels, alternately lined-up along the towering construction between the wind turbines. Each of ledges includes an upper ledge surface and/or a lower ledge surface, slanted at a slope for deflecting ingoing wind and/or diffusing outgoing wind toward and away from the adjacent wind turbine, respectively. A photovoltaic (PV) solar panel layout is disposed on upper ledge surface, and includes at least one PV solar panel for absorbing and converting solar energy into electricity. The system may include one or more energy storage modules, usually operational for being lifted
(Continued)

along towering construction. The towering construction may include wind and solar sensors and may be rotatable, so as to adjust horizontal orientation of towering construction for optimal energy harvesting.

19 Claims, 8 Drawing Sheets

(51) Int. Cl.
| | |
|---|---|
| *F03D 1/04* | (2006.01) |
| *F03D 3/00* | (2006.01) |
| *F03D 3/02* | (2006.01) |
| *F03D 9/14* | (2016.01) |
| *F03D 9/16* | (2016.01) |
| *F03D 13/20* | (2016.01) |
| *H02S 20/32* | (2014.01) |
| *H02S 40/38* | (2014.01) |

(52) U.S. Cl.
CPC ............... *F03D 3/02* (2013.01); *F03D 9/14* (2016.05); *F03D 9/16* (2016.05); *F03D 13/203* (2023.08); *H02S 20/32* (2014.12); *H02S 40/38* (2014.12)

(58) Field of Classification Search
CPC . F03D 1/041; F03D 1/02; F03D 3/005; F03D 3/02

See application file for complete search history.

(56) References Cited

U.S. PATENT DOCUMENTS

| | | |
|---|---|---|
| 2019/0078554 A1 | 3/2019 | Jacob |
| 2021/0040937 A1* | 2/2021 | Mizerit ................. F03D 3/0418 |
| 2021/0203268 A1 | 7/2021 | Gomberg |

FOREIGN PATENT DOCUMENTS

| | | |
|---|---|---|
| WO | 2011/098906 A2 | 8/2011 |
| WO | 2012046969 A2 | 4/2012 |
| WO | 2014025124 A1 | 2/2014 |
| WO | WO-2020230148 A1 * | 11/2020 ............. F03D 13/20 |

OTHER PUBLICATIONS

International Search Report and Written Opinion for PCT/IL2022/050959, filed Sep. 1, 2022.

European Search Report dated Jun. 2, 2025 for European Application No. 22863802.

* cited by examiner

ENERGY HARVESTING SYSTEM

FIELD OF THE INVENTION

The disclosed apparatus relates, in general, to devices and methods related to energy harvesting from renewable resources, and in particular, to structures for harvesting wind and solar energy.

BACKGROUND OF THE INVENTION

Humanity's ever-growing energy consumption, which energy is still mainly derived from non-renewable energy sources such as fossil fuels and the like, has become a major worldwide issue. This issue involves two aspects. Firstly, there is the risk of running out of energy resources due to overuse of non-renewable resources. The second and more urgent aspect is the danger of increased pollution of the environment as a result of the non-renewable energy consumption, which can result in contaminated air, global warming, extinction of plant and animal species, and general destruction of the ecological balance. Intensive research is ongoing after novel energy sources, and development of technologies which allow high-efficiency harnessing of the prevalent renewable energy sources. Two of the most central renewable energy sources are solar energy and wind energy.

SUMMARY OF THE INVENTION

In accordance with one aspect of the present invention, there is thus provided an energy harvesting system for mounting on a towering construction, for harvesting energy from renewable resources. The energy harvesting system includes an array of wind turbines dispersed along the towering construction and configured to rotate when exposed to a wind load for converting wind kinetic energy into a different form of energy, and a plurality of laterally outlying ledges branching outwardly in vertically spaced-apart respective levels, alternately lined-up along the towering construction above one of, below one of, or between two of, the wind turbines. Each of the ledges includes at least one of an upper ledge surface, which is slanted at a slope for deflecting ingoing wind upwardly toward an immediately adjacent-above wind turbine, and/or for diffusing outgoing wind downwardly away from an immediately adjacent-above wind turbine; and a lower ledge surface, which is slanted at a slope for deflecting ingoing wind downwardly toward an immediately adjacent-below wind turbine, and/or for diffusing outgoing wind upwardly away from an immediately adjacent-below wind turbine, such that each of the wind turbines is disposed below an immediately adjacent-above lower ledge surface and/or above an immediately adjacent-below upper ledge surface. Each of the ledges also includes a photovoltaic (PV) solar panel layout disposed at least on the upper ledge surface, the solar panel layout including at least one PV solar panel for absorbing and converting solar energy into electricity. The energy harvesting towering construction may also include a gravitational energy storage module, configured to conserve the energy of the electricity produced by the wind turbines and the PV solar panels, by elevating mass to an elevated position on the towering construction and utilizing the stored energy by allowing the mass to drop from the elevated position to a lower position. The gravitational energy storage module may include at least one of water, elevated within water tubes extending along the towering construction, to a water tank disposed at the elevated position, by a water pump powered by the produced electricity; and a weighted load configured to be lifted along the towering construction to the elevated position by the produced electricity and allowed to be dropped to the lower position for releasing energy. The weighted load may include electric batteries, or electric capacitators. The water tubes may extend adjacently to the PV panels such that the water flowing within the water tubes is operational for at least one of conveying a cooling effect to the PV panels, and conveying a cleansing effect to the PV panels, for increasing effectivity of the PV panels. The water tubes may be in fluid communication with a water supply system, allowing streaming the water into the water supply system at or above a predetermined pressure level. The energy harvesting system may include a sun-heated boiler disposed on the towering construction, wherein the water tubes are in fluid communication with the sun-heated boiler, allowing the water to be heated before being streamed into the water supply system.

At least one of the upper ledge surface and the lower ledge surface may be slanted at a fixed angular elevation relative to the horizon. The fixed angular elevation of the upper ledge surface may be in the range of 1°-45° relative to the horizon, or more specifically in the range of 27°-33° relative to the horizon. The angular elevation relative to the horizon of at least one of the upper ledge surface and the lower ledge surface may be dynamically adjustable.

The plurality of laterally outlying ledges may span a portion of the circumference of the towering construction, the portion including at least one azimuth range of 90°-270° relative to the true north, and 270°-90° relative to the true north. The PV solar panel may be tiltable with respect to a north-south axis. allowing adjusting the angle of the surface of the PV solar panel relative to the true north, for increasing absorption of solar energy by the PV solar panel. The angular elevation of the PV solar panel with respect to the horizon may be adjustable, for increasing absorption of solar energy by the PV solar panel. The energy harvesting system may include a controller configured to tilt the PV solar panel according to a predetermined program.

An upper portion of the towering construction may be configured to be horizontally rotatable about a vertical axis running there-through, for adjusting the horizontal orientation of the wind turbines and of the PV solar panel layout, which are disposed on the towering construction, for increasing exposure of the wind turbines to the wind load and/or exposure of the PV panels to the solar energy. The energy harvesting system may further include at least one wind sensor, configured to measure the wind load at least at one portion of the circumference of the towering construction; at least one solar sensor, configured to measure the intensity of the solar energy at least at one portion of the circumference of the towering construction; and a controller, wherein the controller is configured to receive data from the wind sensor and the solar sensor; to analyze the data so as to define an optimal directionality of the towering construction with respect to the true north in which the energy harvesting system harvests energy at a maximal efficiency; and to provide a signal indicating the optimal directionality.

The towering construction may be configured to be tilted at a non-vertical slant, allowing increasing the exposure of the solar panel to solar energy. The towering construction may include a steel tower-crane-like structure.

In some embodiments, at least one of the wind turbines may include a vertical axis. In some embodiments, at least one of the wind turbines may include a horizontal axis.

BRIEF DESCRIPTION OF THE DRAWINGS

The present invention will be understood and appreciated more fully from the following detailed description taken in conjunction with the drawings in which:

FIG. 3A is a schematic illustration of an embodiment of an energy harvesting system, constructed and operative according to the present invention, including wind and solar sensors and rotatable about an axis running there-through;

DETAILED DESCRIPTION

The present invention overcomes the disadvantages of the prior art by providing an energy harvesting system, for harvesting energy from renewable resources. The system includes an array of wind turbines disposed along a towering construction and configured to rotate when exposed to a wind load, for converting the wind kinetic energy into a different form of energy, and a plurality of laterally outlying ledges branching outwardly in vertically spaced-apart respective levels, alternately lined-up along the towering construction between the wind turbines. Each of the ledges includes an upper ledge surface and a lower ledge surface, which ledge surfaces extend outwards from their respective positions on the towering construction at opposing vertical slants, such that distal ends of the respective upper ledge surface and lower ledge surface are adjacent or connected. The upper and lower ledge surfaces are slanted at a slope for deflecting ingoing wind upwardly and downwardly, respectively, toward an immediately adjacent wind turbine, and/or diffusing outgoing wind downwardly and upwardly, respectively, away from the adjacent wind turbine. A photovoltaic (PV) solar panel layout is disposed at least on the upper ledge surface, and includes at least one PV solar panel for absorbing and converting solar energy into electricity. The laterally outlying ledges usually span at least half of the circumference of the energy harvesting system. The system may include one or more energy storage modules, usually operational for being lifted along the towering construction, for accumulating and storing energy for later use. The towering construction may also include wind and solar sensors and may be rotatable, so as to adjust the horizontal orientation of the towering construction according to the prevalent wind load and solar intensity for optimal energy harvesting.

Reference is now made to the Figures, in which like numbers designate like parts.

Figure 1:
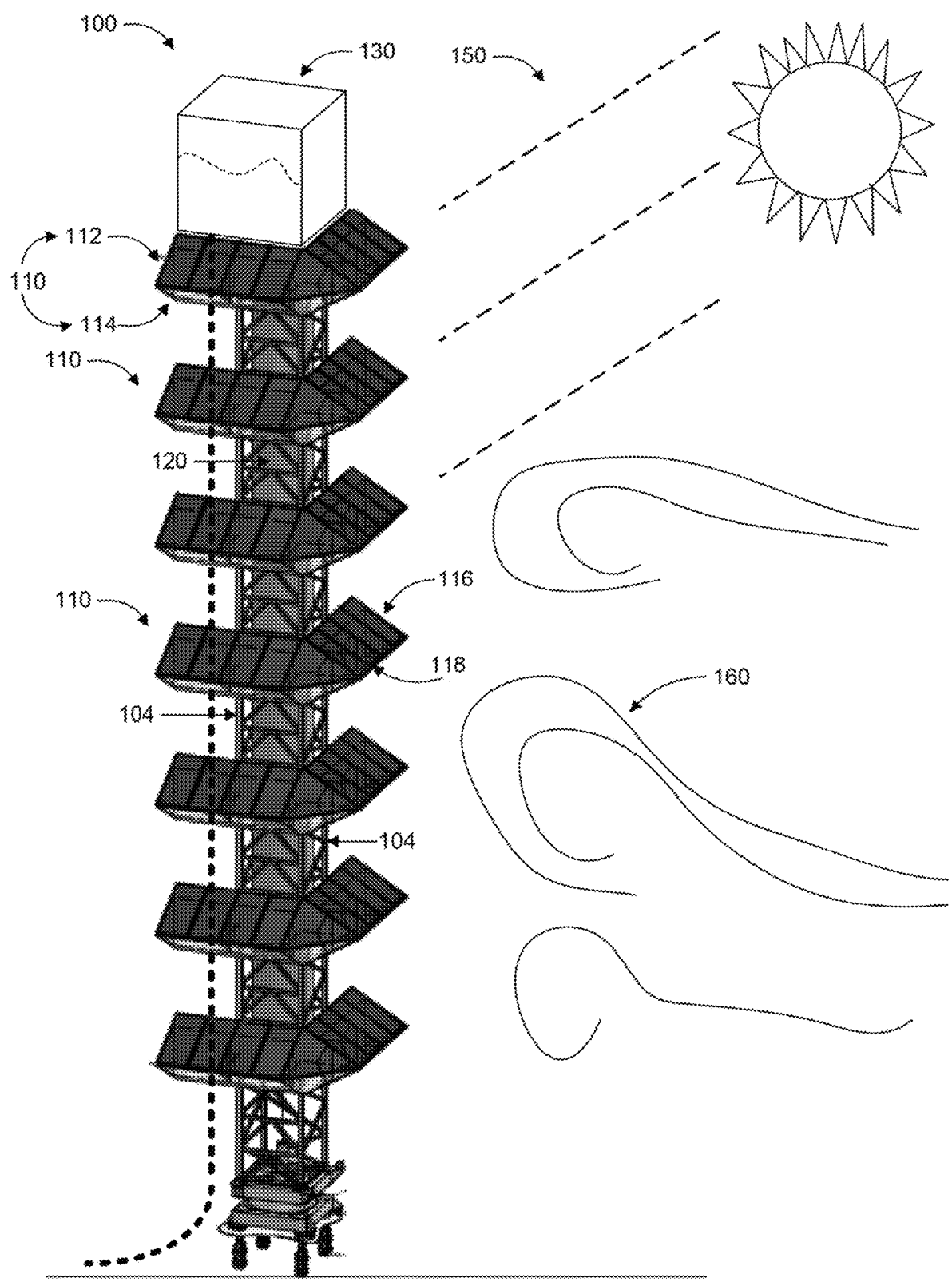
FIG. 1 is a schematic illustration of an embodiment of an energy harvesting system, constructed and operative according to the present invention, including an elevated water tank.

FIG. 1 is an illustration of an energy harvesting system, designated 100, constructed and operative according to the present invention. System 100 is installed upon a towering construction 102, and includes an array of wind turbines 120 dispersed along towering construction 102 and interspersed with a plurality of laterally outlying ledges 110. Each of ledges 110 includes an upper ledge surface 112 and a lower ledge surface 114. Ledge surfaces 112, 114 extend peripherally from the positions on the towering construction walls 104 to which they are each respectively coupled. Upper ledge surface 112 extends at a downward slope and lower ledge surface 114 extends at an upward slope, such that ledge surfaces 112 and 114 meet at their distal ends. Upper ledge surface 112 includes a photovoltaic (PV) solar panel layout 116, made up of an array of solar panels 118 which substantially overlay upper ledge surface 112. Water tank 130 is installed at an upper region of towering construction 102, and is in fluid communication with water tubes 132, which extend from the bottom to the top of towering construction 102.

Figure 7:
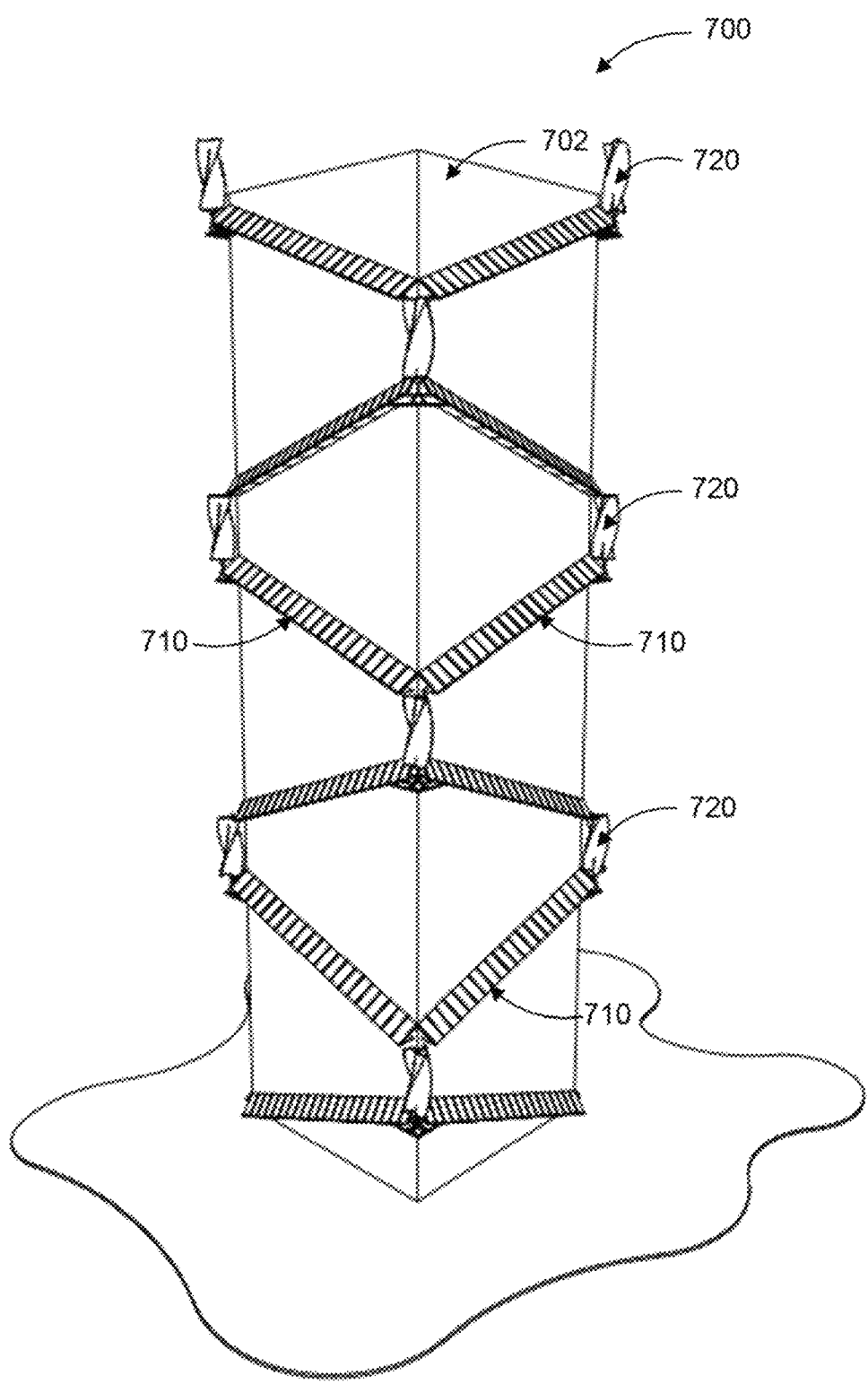
FIG. 7 is a schematic illustration of an embodiment of an energy harvesting system, constructed and operative according to the present invention, wherein the towering construction is an existing building.

Towering construction 102 includes a tower-crane-like vertical structure, e.g., featuring a lattice of beams, usually made of steel but possibly including any other strong, durable and easy to construct material, e.g., aluminum, plastic, etc. The steel crane-like structure has several substantial advantages, including sturdiness, durability and stability even when extending to considerable heights (e.g., 40-50 meters), easy and low-cost production and erection, low wind drag profile, and in particular a low ground surface-area footprint. This structure is also well suited to being rotated about a vertical axis running there-through or being tilted to a non-vertical slant, which possibilities are explained hereinbelow with reference to FIGS. 3A-3D. The crane-like structure also allows easy modularity, i.e., to easily extend or reduce the height of towering construction 102 according to need, respectively increasing or reducing the number of ledges 110 installed there-upon. However, the towering construction can include any other vertically extending structure, either erected especially to serve as an energy harvesting system or for any other purpose, including a skyscraper, a multi-story building, a pole, a lamp post, a tower-crane, a tree trunk, and the like. When the towering construction has hollow spaces or compartments along its length, particularly (but not limited to) when the hollows are substantially open to wind flow from at least two opposing all directions, the wind turbines may be disposed within these hollows. When the towering construction contains no such hollows, the wind turbines, as well as the ledges, may also be disposed on the circumference of the towering construction. An add-on embodiment exemplifying addition of the system to an existing polygonal building (e.g., featuring a full rectangular cap) is shown in FIG. 7.

Figures 2A, 2B:
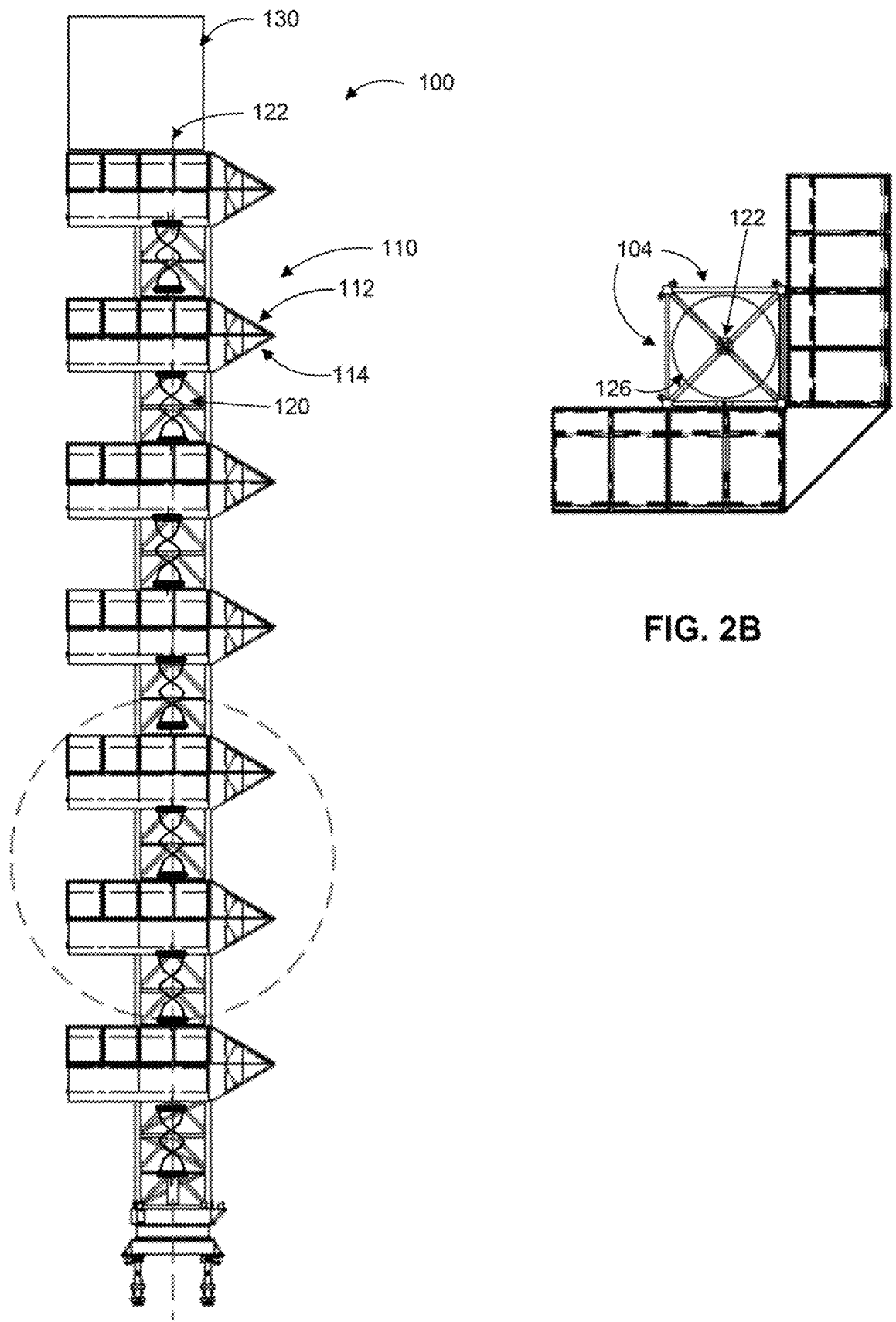
FIG. 2A is a schematic cross-sectional illustration of the energy harvesting system of FIG. 1.
FIG. 2B is a schematic illustration of the energy harvesting system of FIG. 1 from top view.

Reference is also made to FIG. 2A, which is a cross-sectional illustration of energy harvesting system 100, and to FIG. 2B which is an above-view of energy harvesting system 100 (water tank 130 is excluded for clarity). Wind turbines 120 are vertical-axis wind turbines, which are aligned along the length of towering construction 102 such that they share a substantially common vertical axis 122. Vertical axis 122 runs through the center of towering construction 102, i.e., through the center of the virtual horizontal circle 126 which is enclosed by walls 104 of towering construction 102. Each of turbines 120 is positioned between two laterally outlying ledges 110, one ledge 110 above turbine 120 and one below. When wind turbines 120 are aligned with the central vertical axis 122 of towering construction 102, the vertical axis of wind turbines 120 together with their even and balanced structure renders turbines 120 equally responsive to wind loads originating from any direction. Alternatively, wind turbines 120 may not share a common vertical axis, and each turbine 120 may be located at an independent location relative to vertical axis 122. Conversely, wind turbines 120 may indeed share a common vertical axis, which does not run through the center of towering construction 102. More than one wind turbine 120 may be disposed at each "floor" (level) of towering construction 102, i.e., between two neighboring adjacent ledges 110, and turbines 120 may be arranged in parallel vertical arrays or distributed in any other formation. The towering construction itself may not be vertically uniform, e.g., may have a zigzag or a slanting vertical formation, and each wind turbine 120 may be disposed at a central position of its respective floor, which is not vertically aligned with the central position of neighboring floors. Wind turbines 120 may be positioned adjacently to walls or at corners of a towering construction, and respective ledges may be installed above and below the turbines (120) which slantingly extend along the walls of the towering construction (e.g., the embodiment of FIG. 7).

Figure 3A:
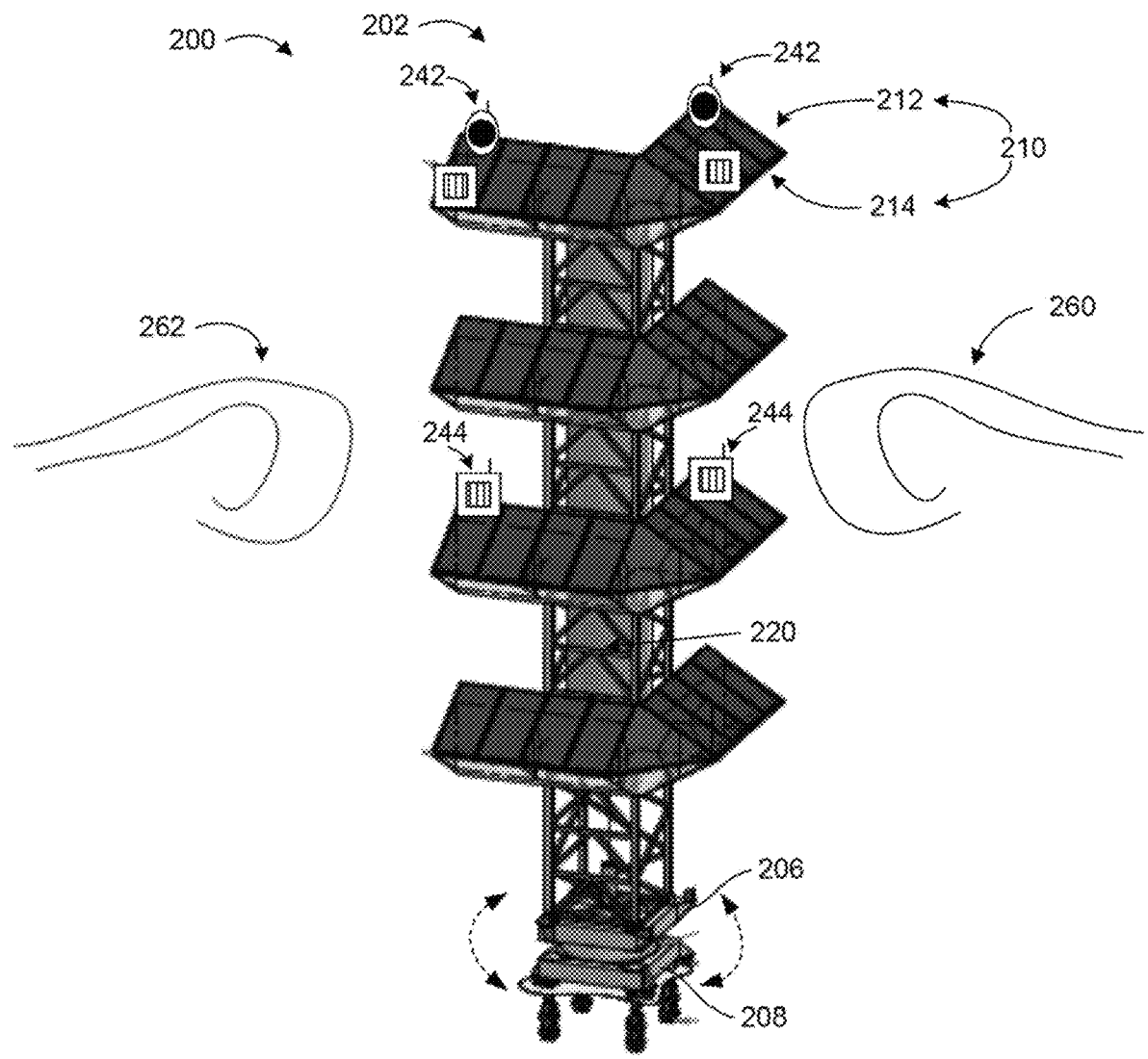
Figure 3B:
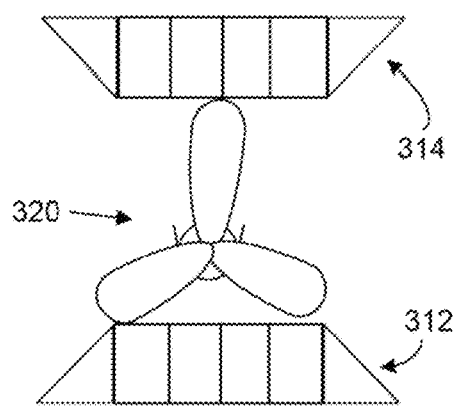
FIG. 3B is a schematic illustration of a horizontal-axis wind turbine positioned between two ledges, of the embodiments of FIG. 1 or 3A.
Figures 3C, 3D:
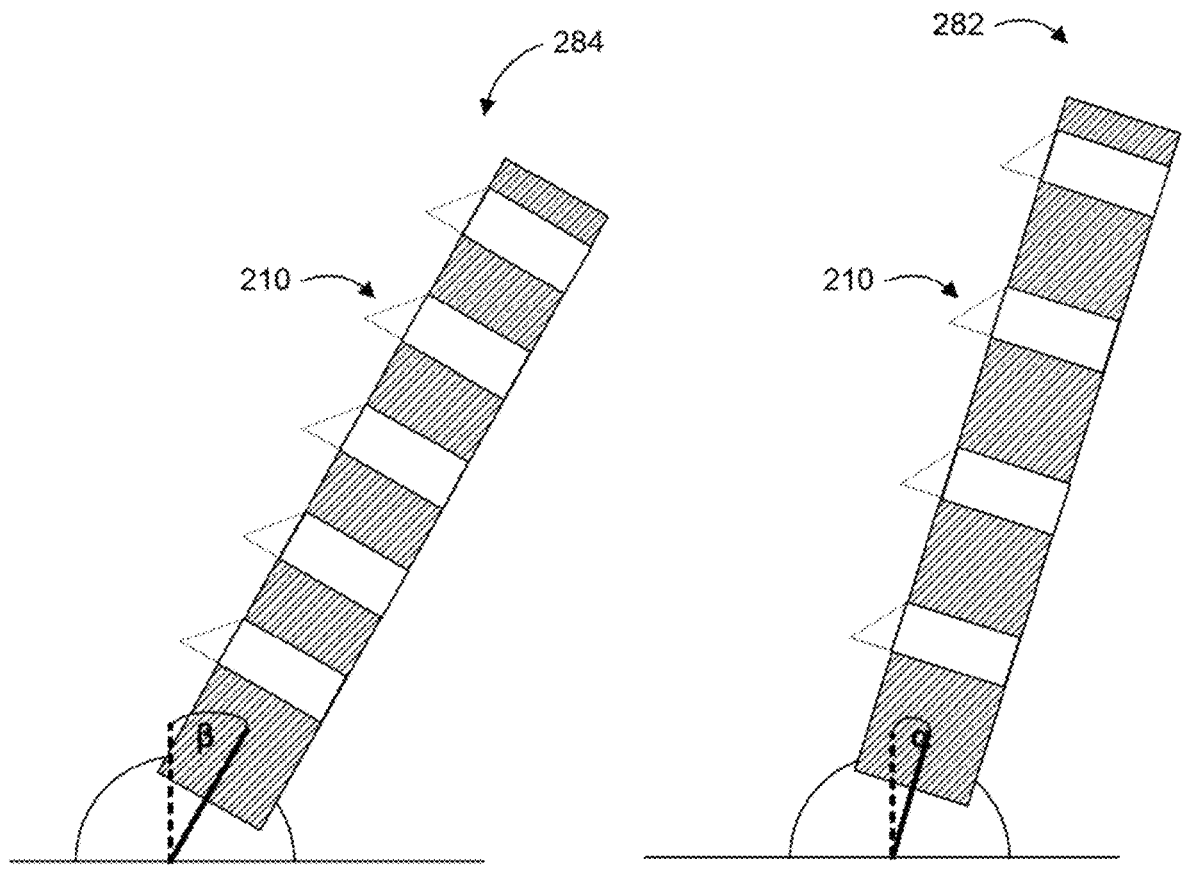
FIG. 3C is a schematic illustration of a towering construction, constructed and operative according to another embodiment of the present invention, which is tilted to slant at a first non-vertical angle.
FIG. 3D is a schematic illustration of the towering construction of FIG. 3C, which is tilted to slant at a second larger non-vertical angle.
Figure 3E:
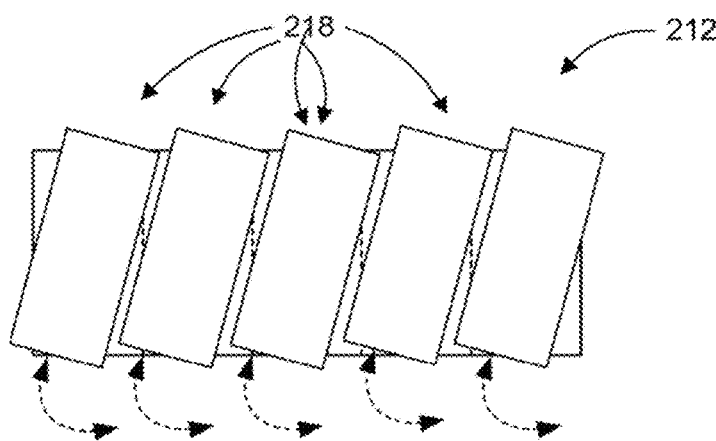
FIG. 3E is a schematic illustration of an upper ledge surface of the energy harvesting system of FIG. 3A, including tiltable PV solar panels.

Ledges 110 which hem in turbines 120 at least to some extent, increase the wind speed and/or the wind pressure at turbines 120, elevating the quantity of (kinetic) energy harvested by turbines 120, as will be further explained herein. Each of ledges 110 spans substantially half of the circumference of towering construction 102. Ledges 110 are usually disposed so as to cover an azimuth range which matches the trajectory of the sun during daytime, i.e., 90°-270° relative to the true (geodetic) north, or 270°-90° relative to the true north, depending on which side of the equator towering construction 102 is erected. PV solar panel layout 116 covers upper ledge surface 112, such that at least one of PV panels 118 is exposed to direct sunlight during all daylight hours of a 24 hour day. Alternatively, ledges 110 may span a smaller section of the circumference of towering construction 102, e.g., 135°-225; a larger section of the circumference of towering construction 102, e.g., the entire circumference; or may be intermittently dispersed around the circumference of towering construction 102, with gaps between portions of ledge 110. Upper ledge surface 112 of ledges 110 may be entirely covered by PV solar panel layout 116, and may even be essentially made up of PV solar panels 118. Also sections of ledge 110 which point in a direction which is never exposed to direct sunlight may be covered by PV solar panels 118, so as to absorb reflected or ambient solar energy. Although PV solar panels are most efficient at converting direct sunlight into electricity, they are also effective at absorbing and converting reflected/ambient solar energy. Therefore, lower ledge surface 114 may also be coated with PV solar panels 118, so as to increase the yield of energy harvesting system 100. Alternatively, PV solar panel layout 116 may cover only a portion of ledge 110, usually the portion which points in the direction of prevalent direct sunlight, whereas other areas of ledge 110 may remain uncovered by PV panels, serving (only) the purpose of increasing the wind speed and/or the wind pressure at turbines 120. The angular elevation relative to the horizon, at which upper ledge surface 112 and/or lower ledge surface 114 are slanted, may be fixed, possibly according to an angle which is, on average, most conducive both to wind deflecting and channeling and to solar energy absorption. For example, the angular elevation of upper ledge surface 112 may be in the range of 1°-45° relative to the horizon, or more specifically in the range of 27°-33° relative to the horizon, or within another range selected according to latitude and/or season. Alternatively, the angular elevation relative to the horizon of ledge surfaces 112 and 114 may be dynamically adjustable, as will be further explained with respect to the positioning and orientation of the PV solar panels (FIG. 3E).

Towering construction 102 may include a plurality of ledges 110, disposed at different heights there-along, which may each span different portions of the circumference of towering construction 102, and/or may each include a different number of PV solar panels 118. The vertical distance between each pair of neighboring ledges 110 may be uniform along towering construction 102, or may vary. One of the considerations in the vertical spacing apart of ledges 110 may be to minimize the shade that each ledge 110 casts on the PV solar panels 118 residing upon a neighboring ledge 110 located below it. The further spaced apart ledges 110 are from each other, the less they will block their neighboring ledges 110 from direct sunlight. However, the further spaced apart ledges 110 are along towering construction 102 the less ledges 110 will fit thereon, which may reduce the number of PV panels 118 which are in the capacity of towering construction 102 to support and, by extension, reduce its solar energy harvesting capacity. The preponderance of direct sunlight in a particular geographical region, as well as the difference between the electricity yield of PV panels 118 when exposed to direct sunlight, to their yield when exposed to indirect or reflected sunlight, are factors which should be taken into account with regard to the spacing apart of ledges 110. This is with regard only to solar energy calculations, but there are of course also wind energy considerations. The vertical height of each wind turbine 120 corresponds to the vertical distance between the two ledges 110 which encompass it, i.e., is of a height which fits within, and optionally fills, the gap between the two ledges 110, such that a larger gap between two neighboring ledges 110 allows inserting at least one larger and more productive wind turbine therebetween. On the other hand, as mentioned, larger gaps between ledges 110 necessarily decreases the number of ledges 110, and correspondingly the number of PV panels 118 which can be installed on towering construction 102. Therefore, in addition to the solar energy considerations that were mentioned previously in the context of spacing ledges 110, the prevailing wind conditions in the particular vicinity of towering construction 102 should also be accounted for.

Even within a particular towering construction 102, the spacing of ledges 110 there-along, and the characteristics of each ledge 110 with respect to the portion of the circumference of towering construction 102 which it spans and with regard to its coating with PV panels 118, may be planned according to the differences in wind speed and wind direction, and sunlight absorption, at different heights along towering construction 102. For example, the lower section of a towering construction, e.g., the bottom 16 meters from the ground, may include ledges 110 installed every 4 meters, with a relatively small wind turbine 120 disposed in between, and with PV panels 118 only on the upper ledge surface 112 of each of the ledges 110. The section of the towering construction 102 above 16 meters from the ground may include ledges installed every 6 meters, with a larger wind turbine installed there-between, and with PV panels 118 covering also the lower ledge surface 114. This distinction between the lower and upper sections of towering construction 102 is planned in accordance with higher wind loads and more reflected sunlight being prevalent at the higher sections of towering construction 102, which make larger wind turbines, and additional PV solar panels which harvest indirect sunlight, more profitable at these sections. The wind and sunlight conditions may be widely diverse in different settings, however, and energy harvesting system 100 may be adapted to suit the climate conditions and construction settings in which it is destined to be erected, so as to include an optimal combination of wind turbines, ledges, and solar panels installed there-upon.

Another method of adapting to the prevalent wind and solar conditions for increased energy harvesting efficiency, may be adjusting the directionality of the elements of the energy harvesting system, e.g., the PV solar panels and/or the towering construction. Reference is now made to FIG. 3A which shows an energy harvesting system 200 including a rotatable towering construction 202 and adjustable PV solar panels 218. Towering construction 202 includes revolving base 206 at a bottom region of towering construction 202, and at least one solar intensity sensor 242 and at least one wind intensity sensor 244 which are coupled with controller 240. Revolving base 206 carries an upper portion of towering construction 202, including ledges 210 and wind turbines 220, and is coupled with fixed base 208, such that revolving base 206 is configured to revolve about a vertical axis running through the center of revolving base 206, with respect to fixed base 208 which remains stationary. When revolving base 206 revolves it adjusts the azimuth directionality of ledges 210 and wind turbines 220 with respect to the true (geodetic) north. Solar intensity sensor 242 and wind intensity sensor 244 are configured to measure the solar intensity and wind intensity, respectively, at least a section of the circumference of towering construction 202. A plurality of sensors 242 and 244 may be positioned at different positions around the circumference of towering construction 202, and at different heights there-along. The data measured by sensors 242 and 244 is received by controller 240, which is configured to: analyze the received data; compute the potential quantity of wind and solar energy, combined, which may be harvested when towering construction 202 points in different directions; assess a substantially optimal directionality of towering construction 202 with respect to the true north in which the energy harvesting system harvests energy at a maximal efficiency; and to turn revolving base 206 so as to point towering construction 202 in the assessed optimal direction, or to provide a signal indicating the optimal direction for towering construction 202. Sensors 242 and 244 may be operational to continuously measure the solar and wind intensity, and controller 240 may be operational to continuously make assessments based on the provided data. Alternatively, controller 240 may make assessments intermittently, for example, every day, every month, every change of season, and the like. Revolving base 206 may be at the bottom of towering construction 202, such that almost the entire length of towering construction 202 is rotated when revolving base 206 revolves, or may be at any position along the height of towering construction 202 (provided there is at least one ledge 210 and one wind turbine 220 there-above), such that towering construction 202 includes a bottom portion, including ledges 210, PV solar panels 218, and wind turbines 220, which remains in a fixed directionality, and an upper portion which is rotated by revolving base 206 according to the assessments of controller 240. With reference to FIG. 3B, it is noted that at least one of the wind turbines may be a horizontal-axis turbine 320, instead of vertical-axis turbines, or may have any other axis operational for wind energy harvesting. The rotation of towering construction 202 to face an optimal directionality is more significant in the context of horizontal-axis wind turbines 320, as they are efficient at wind-energy harvesting only when the blades of turbine 320 are facing the incoming wind, in contrast to vertical-axis turbines which are substantially omni-directional.

In addition to rotating about an axis, towering construction 202 may also be operational to slant at an off-vertical angle, either dynamically on a hinge, according to sensed wind and solar conditions, or statically, i.e., in a fixed construction. With reference to FIG. 3C, towering construction 282 is slanted at a first off-vertical angle α, and has an increased number of ledges 210 per meter relative to towering construction 202. With further reference to FIG. 3D, towering construction 284 is slanted at a second increased off-vertical angle β (where β>α), and has an increased number of ledges 210 per meter relative to towering construction 282. In some embodiments the slant may be static, where construction 282, 284 is fixedly slanted at a particular angle and in other embodiments construction 282, 284 is dynamically slanted at a changeable angle by a slanting mechanism. If the vertical distance between ledges 210 and the dimensions of solar panels 218 are maintained as in towering construction 202, the off-vertical slant of towering constructions 282, 284 may simply reduce the over-shadowing which each of ledges 210 casts on a respective neighboring ledge 210 installed there-below, at least during some hours of the day. Reducing the over-shadowing increases the absorption of direct solar energy and the production of electricity by solar panels 218, which are layed out on the neighboring ledge 210. Additionally or alternatively, the density of ledges 210 (including solar panel layout 216) per meter along the height of towering construction 282, 284, and/or the length of the solar panels, may be increased, correspondingly increasing the energy yield of the energy harvesting system. The angular elevation relative to the horizon of solar panels 218 may also be adjustable, as is further explained with reference to the following FIG. (3E), so as to be optimally coordinated with the off-vertical slant of towering constructions 282, 284. The optional off-vertical slant of the towering construction may have additional advantages, such as allowing the towering construction to blend more easily in different environments, both visually and practically.

Reference is now made to FIG. 3E which is an enlarged illustration of ledge 210, including PV panels 218 which are tilted or rotated away from their "paving stone orientation", i.e., the orientation when PV panels 218 lay side by side forming a continuous coating of upper ledge surface 212, so as to better absorb direct sunlight. As the trajectory of the sun in the sky during the course of a day is fixed, the tilting of PV panels 218 may be predefined and repeated on a daily basis so as to substantially track direct sunlight. Alternatively, PV panels 218 may be set at default to remain stationary in their paving stone orientation, and may be tilted only under particular conditions, e.g., when an indication is received from controller 240. The optional rotation of PV panels 218 may be another parameter which controller 240 uses to assess the optimal direction of towering construction 202. For example, if the intensity of winds 260, 262 is highest at an azimuth of 90° but solar intensity is highest at 135° azimuth, and solar intensity is currently substantially more energy proficient, controller 240 may indicate the preferred rotation of revolving base 206 and the respective portion of towering construction 202 so that PV panels 218 will point in the direction of 135° azimuth. Alternatively, controller 240 may assess that it is preferable to position towering construction 202 such that ledges 210 will point in the direction of 90° azimuth (or 270°, as will be further explained with reference to FIGS. 6A and 6B) and that only PV panels 218 will be rotated such that their surfaces point substantially in the direction of 135° azimuth.

With respect to direct sunlight tracking, PV panels 218 may be rotatable along a north-south axis, such that the azimuth in which the surface or face of panels 218 is pointing may be adjusted, e.g., to point eastwards (90° relative to the true north) in the morning hours and westwards (270° relative to the true north) in the evening hours. In addition, the angular elevation relative to the horizon of PV panels 218 may also be adjustable, optionally changing to a vertically upright position, a horizontally flat position or to any other angle. These adjustments of the angle of PV panels 218 may be only for the purpose of tracking the sun (for example, the sun is lowest in the sky at sunrise and sunset, and is highest in the sky at noon, so the angular elevation of panels 218 may be changed accordingly), or the adjustments may be also for the purpose of channeling the wind towards or away from turbines 220. In this context, the PV solar panels may change not only their angular orientation, but even their very location on towering construction 202. For example, an array of PV panels may be positioned, during the peak of sunlight hours, such that they are in continuation of upper ledge surface 212, slanting downwardly and distally from towering construction 202, so as to enhance sunlight absorption; and in the night hours they may be folded inward, i.e., to slant downwardly towards towering construction 202, so as to channel wind towards turbines 220. For another example, some of panels 218, which during the daylight hours are positioned on ledge surface 212 so as to absorb direct solar energy, may be repositioned in the night hours so as to form vertical walls. These walls together with lower ledge surface 214 and upper ledge surface 212 basically enclose the wind turbine, at least one from one direction, which may substantially enhance wind intensity and speed at turbine 220. These angular and position adjustments of the PV solar panels may be electrically powered, mechanically powered, e.g., with springs, manually powered, e.g., with a crank, or any combination of the above.

Referring back to FIG. 1, water tank 130 is disposed at an elevated position along towering structure 102, usually near the top thereof, and accumulates water that is raised along water tubes 132 by use of the energy harvested by wind turbines 120 and PV solar panels 118 (of energy harvesting system 100). The harvested energy powers a pump (not shown), which raises the water along towering construction 102, within tubes 132. The pump may be mechanically powered by the rotation of wind turbines 120, and/or may be electrically powered by electricity produced by solar panels 118 and wind turbines 120. Water tubes 132 may be connected to an external water source, such as a well, a river, or a lake, or may lead out of a water tank located at the bottom of towering construction 102 (not shown). Raising water along the height of towering construction 102 may conserve the harvested energy in the form of potential energy, with minimal energy loss. When the potential energy is needed for use, the elevated water may be channeled downward to convert the potential energy into kinetic energy, and possibly into other forms of energy. For example, the water may be streamed through a hydro powered turbine which can convert the kinetic energy of the water into electricity. The elevated water has further advantages and may serve additional purposes.

Figure 4:
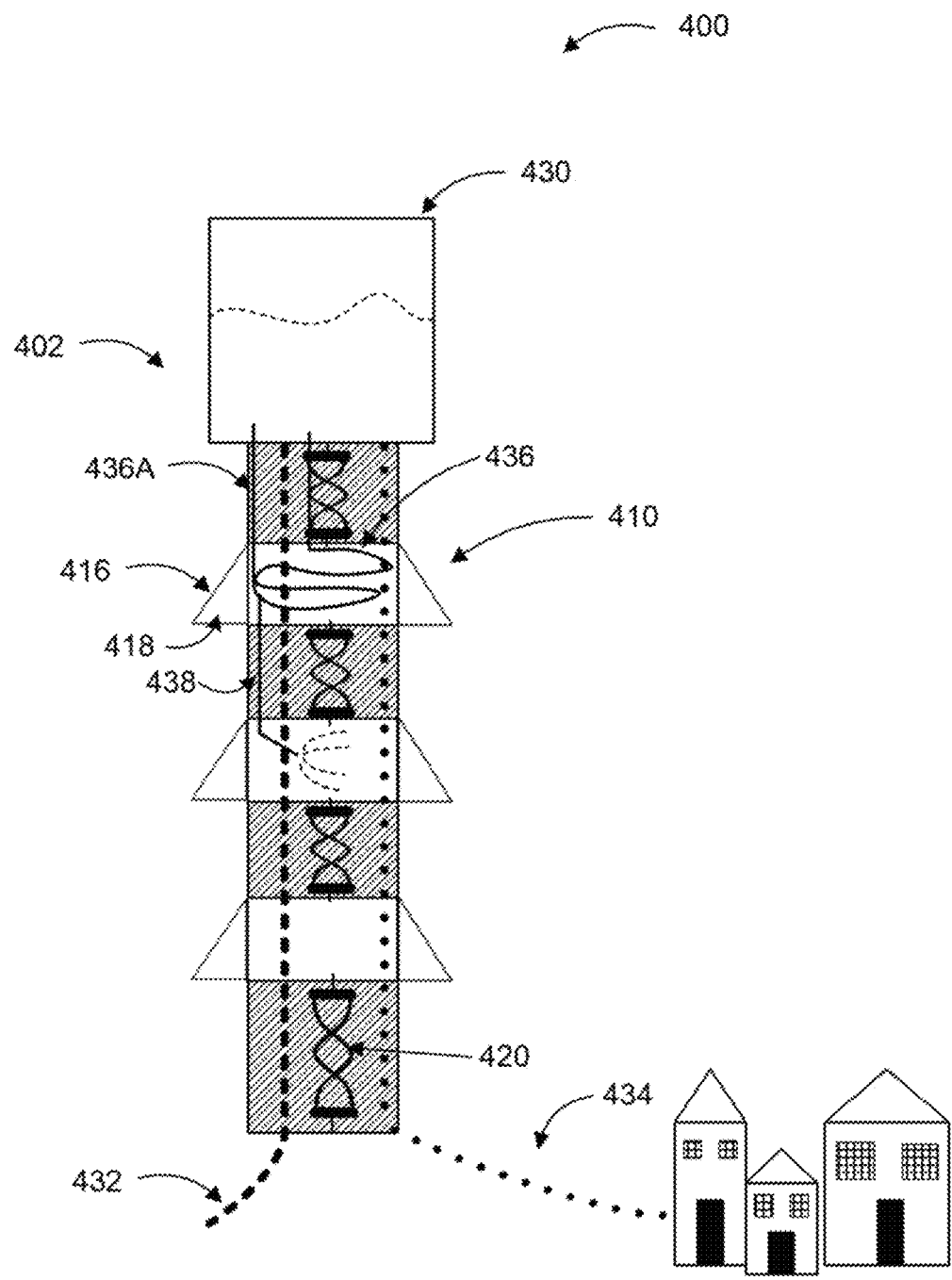
FIG. 4 is a schematic illustration of an embodiment of an energy harvesting system, constructed and operative according to the present invention, including a plurality of water tubes and connected to a water system.

Reference is now also made to FIG. 4, in which energy harvesting system 400 features a variety of water tubes leading in and out of water tank 430. Supply tube 434 channels water which has been elevated and accumulated in water tank 430 to neighboring facilities which require water to be supplied at or above a predetermined pressure, operating in a similar fashion to the operation of a standard water tower. Each additional 10 meters which the water is elevated above the level of the facilities adds an additional 1 atmosphere of pressure to the water in the facilities' water system. For example, if water tank 430 is positioned at the top of towering construction 402, which is at a height of 30 meters above neighboring houses, water from the water tank can be channeled to the neighboring houses at a pressure of 3 atmospheres, which is typically fully sufficient for most household requirements. Some of the water may be held in a sun-heated boiler, which may also be mounted at an elevated position on towering construction 402, so as to also supply hot water to the facilities' water system.

It is noted that also in the context of electricity supply, the energy harvesting system may be on-grid, i.e., connected to a larger or national electricity network, or off-grid, i.e., an independent electricity production and storage system, operational to supply electricity to neighboring facilities. The energy storage modules, e.g., the elevated water tank (130, 430) and the elevated load of FIG. 5, are particularly useful when the energy harvesting system is off-grid.

Another use of the water elevated to the top of towering construction 402 is to cool and/or clean PV solar panels 418 of PV solar panel layout 416. Dirt which accumulates on PV solar panels, and the heating up of the PV solar panels from continuous exposure to direct sunlight, are both factors which may reduce the efficiency of PV panels in converting sunlight into electricity. Cooling tubes 436 extend and wind adjacently to PV panels 418, such that tubes 436 are in contact with the panels 418 and the water within tubes 436 may absorb some of the heat from panels 418, which constantly heat up due to sunlight absorption, for cooling panels 418 and increasing their efficiency. Cooling tubes 436 may be connected in a closed loop to water tank 430, such that water which absorbs heat from panels 418 and heats up, may constantly be removed via tube 436A towards tank 430 and replaced by fresh cool water from tank 430. Alternatively or additionally, water may be streamed through cleansing tube 438, which is an open ended tube that is operationally positioned to stream or spray water on the outer surface of PV panels 418 so as to remove dust and other dirt from PV panels 418. In addition to the cleaning effect, streaming water on panels 418 may also convey a substantial cooling effect thereto.

Figure 5:
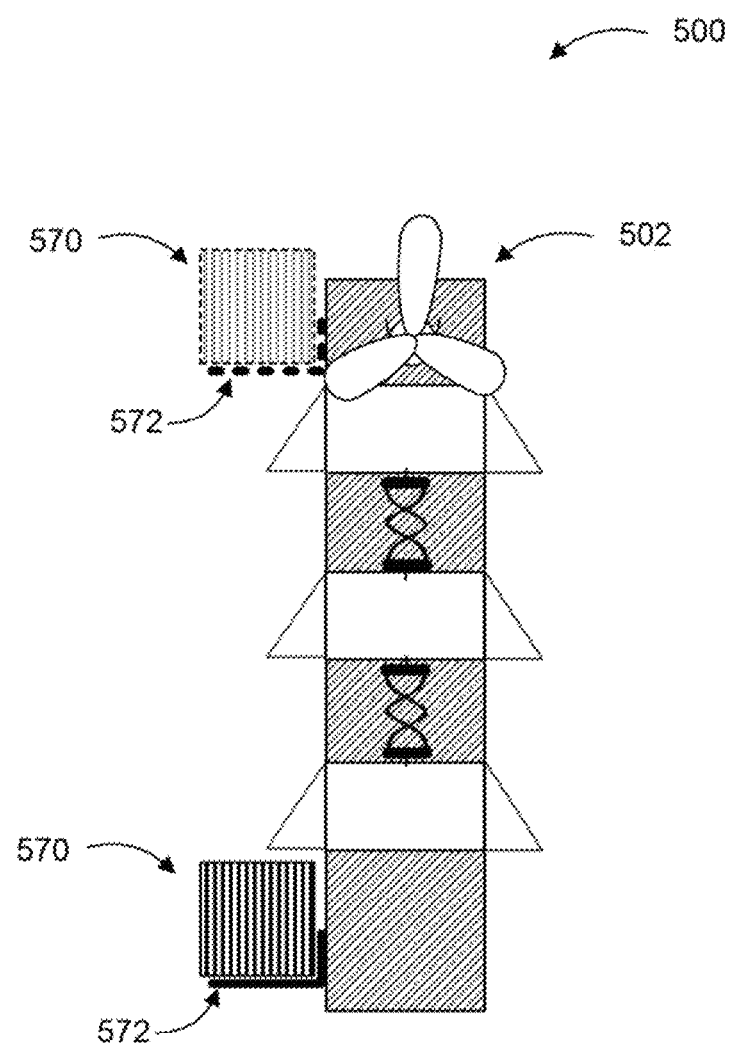
FIG. 5 is a schematic illustration of an embodiment of an energy harvesting system, constructed and operative according to the present invention, including an elevatable weighted load.

Reference is now made to FIG. 5, which shows an energy harvesting system 500 including a weighted load 570 elevated along towering construction 502, as another means of energy storage. Energy harvested by wind turbines 520 and PV solar panels 518 powers a lifting mechanism 572 which raises weighted load 570 along towering construction 502. Lifting mechanism 572 may be mechanically powered by the rotation of wind turbines 520, and/or may be electrically powered by electricity produced by solar panels 518 and turbines 520. The elevation of weighted load 570 converts the energy used to elevate load 570 into potential gravitational energy. This potential gravitational energy may be utilized by lowering or dropping load 570 from its elevated position to a lower position, by virtue of gravity, such that the kinetic energy which weighted load 570 acquires during the lowering process is used to drive an electricity producing dynamo or alternator. Weighted load 570 may include simple heavy material (e.g., lead, sand), water (which may also be utilized in conjunction with the water accumulated at the top of the construction), batteries, capacitors, compressible springs, or any other energy storing artifact or substance which is operational to store electricity or energy. This energy storing artifact, e.g., a battery (or water), has a dual contribution to the energy and electricity storage of the energy harvesting system: first, as a battery which is charged with electricity which may be utilized when needed (or water which may be utilized as well); and second, as an elevated weight which may be dropped from its elevated position to acquire usable kinetic energy, as explained.

Figure 6A:
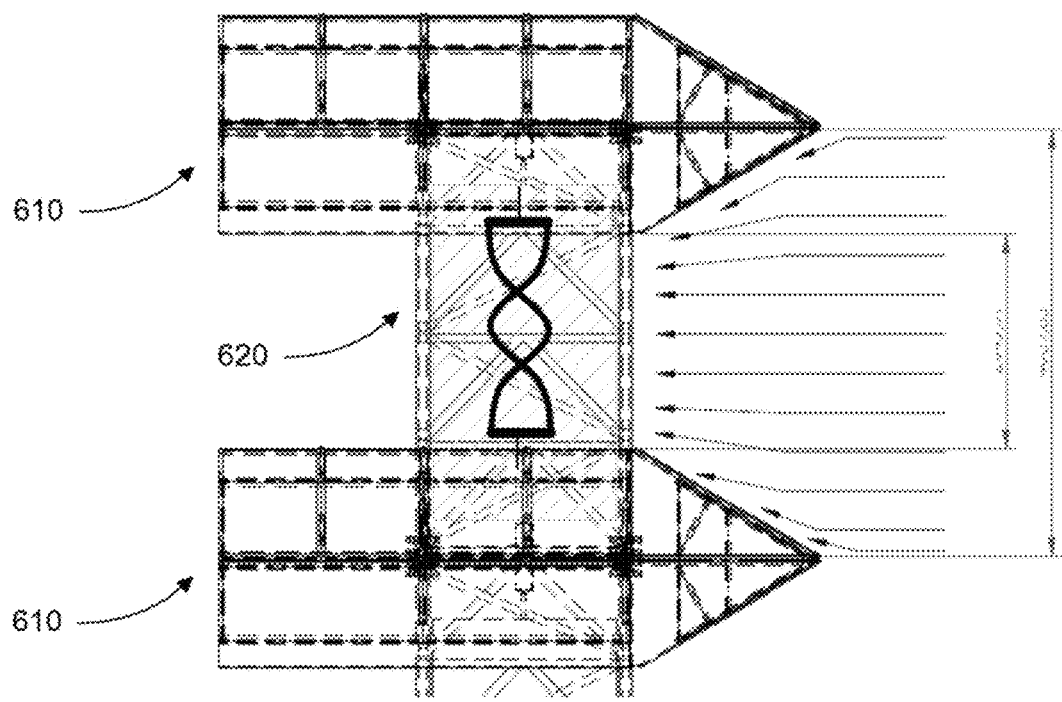
FIG. 6A is a schematic cross-sectional illustration of a portion of an energy harvesting system of any one of the preceding Figures, including two ledges enclosing a wind turbine.
Figure 6B:
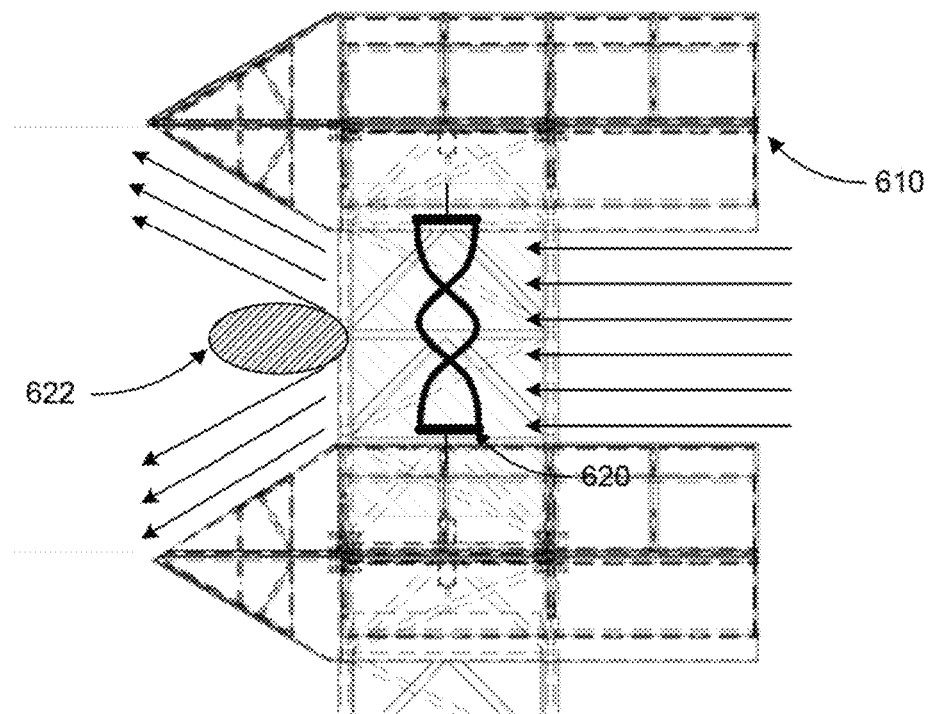
FIG. 6B is a schematic cross-sectional illustration of the portion of an energy harvesting system of FIG. 6A, where the wind is coming from the opposite direction.

With reference to FIG. 6A, a portion of an energy harvesting system is shown which includes two ledges 610 enclosing a wind turbine 620, where wind enters toward wind turbine 620 from the direction of upper ledge surface 612 and lower ledge surface 614, positioned below and above wind turbine 620 respectively. Ledge surfaces 612 and 614 are angled such that they deflect and channel wind, which is blowing upon ledge surfaces 612, 614 in a substantially horizontal direction, towards wind turbine 620 which is positioned there-between. This increases the wind load at turbine 620, and possibly also the wind speed (similar to the venturi effect), at turbine 620, which in turn increases the speed of rotation and the kinetic energy of wind turbine 620. The equation which describes the relation between an increase in speed and an increase in kinetic energy is: $E_k = \frac{1}{2} * m * v^2$, such that $E_k$ is the kinetic energy, m is the mass of the body which gains speed, and v is the velocity of the body. This equation clearly shows that an increase in speed increases the kinetic energy by the order of a square. Therefore increasing the speed of wind turbine 620 is substantial in the context of energy harvesting. FIG. 6B shows the same portion of an energy harvesting system as in FIG. 6A, when the wind blows toward wind turbine 620 from the opposite direction to ledge surfaces 612 and 614. In this case, ledge surfaces 612 and 614 act as wind diffusers, channeling the wind that passes through turbine 620 so as to spread out away from turbine 620. This causes region 622, which is directly behind turbine 620 relative to the incoming wind, to contain a particularly low air pressure, because the wind is diffused away therefrom by ledge surface 612, 614. This low pressure region 622 causes a vacuum suction effect from behind turbine 620 towards the incoming wind, the vacuum suction accelerates the incoming wind, and the accelerated wind increases the velocity of turbine 620.

While certain embodiments of the disclosed subject matter have been described, so as to enable one of skill in the art to practice the present invention, the preceding description is intended to be exemplary only. It should not be used to limit the scope of the disclosed subject matter, which should be determined by reference to the following claims.

The invention claimed is:

1. An energy harvesting system for mounting on a towering construction, for harvesting energy from renewable resources, the system comprising:
   an array of wind turbines dispersed along said towering construction and configured to rotate when exposed to a wind load for converting wind kinetic energy into a different form of energy;
   a plurality of laterally outlying ledges branching outwardly in vertically spaced-apart respective levels, alternately lined-up along said towering construction above one of, below one of, or between two of, said wind turbines, wherein each of said ledges comprises:
   (a) at least one of:
      (1) an upper ledge surface which is slanted at a slope for deflecting ingoing wind upwardly toward an immediately adjacent-above wind turbine, and/or for diffusing outgoing wind downwardly away from an immediately adjacent-above wind turbine; and
      (2) a lower ledge surface which is slanted at a slope for deflecting ingoing wind downwardly toward an immediately adjacent-below wind turbine, and/or for diffusing outgoing wind upwardly away from an immediately adjacent-below wind turbine;
      such that each of said wind turbines is disposed below an immediately adjacent-above lower ledge surface and/or above an immediately adjacent-below upper ledge surface; and
   (b) a photovoltaic (PV) solar panel layout disposed at least on said upper ledge surface, said solar panel layout comprising at least one PV solar panel for absorbing and converting solar energy into electricity; and
   a gravitational energy storage module, configured to conserve the energy of the electricity produced by said wind turbines and said PV solar panels, by elevating a weighted load, configured to be lifted along said towering construction, to an elevated position, by the produced electricity, and allowing the weighted load to drop from said elevated position to a lower position for releasing kinetic energy, wherein the weighted load comprises an electrical/spring energy storing artifact, operational to store further electrical/spring energy produced by said wind turbines and said PV solar panels.

2. The energy harvesting system of claim 1, wherein said electrical/spring energy storing artifact comprises at least one of:
   electric batteries;
   electric capacitors; and
   compressible springs.

3. The energy harvesting system of claim 1, wherein said gravitational energy storage module is configured to further conserve the energy of the electricity produced by said wind turbines and said PV solar panels, by elevating water to an elevated position on the towering construction and utilizing the stored energy by allowing the water to drop from said elevated position to a lower position, wherein said gravitational energy storage module further comprises:
   a water tank, disposed at said elevated position;
   water tubes, extending along said towering construction; and
   a water pump, powered by the produced electricity and operational for elevating water through said water tubes to said water tank.

4. The energy harvesting system of claim 3, wherein said water tubes extend adjacently to said PV panels such that said water flowing within said water tubes is operational for at least one of:
conveying a cooling effect to said PV panels; and
conveying a cleansing effect to said PV panels,
for increasing effectivity of said PV panels.

5. The energy harvesting system of claim 3, wherein said water tubes are in fluid communication with a water supply system, allowing streaming said water into said water supply system at or above a predetermined pressure level.

6. The energy harvesting system of claim 5, comprising a sun-heated boiler disposed on said towering construction, wherein said water tubes are in fluid communication with said sun-heated boiler, allowing said water to be heated before being streamed into said water supply system.

7. The energy harvesting system of claim 1 wherein an upper portion of said towering construction is configured to be horizontally rotatable about a vertical axis running therethrough, for adjusting the horizontal orientation of said wind turbines and of said PV solar panel layout, which are disposed on said towering construction, for increasing exposure of said wind turbines to said wind load and/or exposure of said PV panels to said solar energy.

8. The energy harvesting system of claim 7, wherein said PV solar panel is tiltable with respect to a north-south axis, allowing adjusting the angle of the surface of said PV solar panel relative to the true north, for increasing absorption of solar energy by said PV solar panel.

9. The energy harvesting system of claim 8, comprising a controller configured to tilt said PV solar panel according to a predetermined program.

10. The energy harvesting system of claim 7, wherein the angular elevation of said PV solar panel with respect to the horizon is adjustable, for increasing absorption of solar energy by said PV solar panel.

11. The energy harvesting system of claim 7, further comprising:
at least one wind sensor, configured to measure the wind load at least at one portion of the circumference of said towering construction;
at least one solar sensor, configured to measure the intensity of said solar energy at least at one portion of the circumference of said towering construction; and
a controller, wherein said controller is configured to receive data from said wind sensor and said solar sensor; to analyze said data to define an optimal directionality of said towering construction with respect to the true north in which said energy harvesting system harvests energy at a maximal efficiency; and to provide a signal indicating said optimal directionality.

12. The energy harvesting system of claim 7, wherein said towering construction is configured to be tilted at a non-vertical slant, allowing increasing the exposure of said solar panel to solar energy.

13. The energy harvesting system of claim 1, wherein at least one of said upper ledge surface and said lower ledge surface is slanted at a fixed angular elevation relative to the horizon.

14. The energy harvesting system of claim 13, wherein the fixed angular elevation of said upper ledge surface is in the range of 1°-45° relative to the horizon.

15. The energy harvesting system of claim 14, wherein the fixed angular elevation of said upper ledge surface is in the range of 27°-33° relative to the horizon.

16. The energy harvesting system of claim 1, wherein the angular elevation relative to the horizon of at least one of said upper ledge surface and said lower ledge surface is dynamically adjustable.

17. The energy harvesting system of claim 1, wherein said plurality of laterally outlying ledges span a portion of the circumference of said towering construction, said portion comprising at least one azimuth range of:
90°-270° relative to the true north; and
270°-90° relative to the true north.

18. The energy harvesting system of claim 1, wherein at least one of said wind turbines comprises a vertical axis.

19. The energy harvesting system of claim 1, wherein at least one of said wind turbines comprises a horizontal axis.

* * * * *